(12) United States Patent
Bregoli et al.

(10) Patent No.: US 12,331,965 B2
(45) Date of Patent: Jun. 17, 2025

(54) AIR CONDITIONING SYSTEM WITH INTEGRATED WATER EXTRACTION LOOP

(71) Applicant: LIEBHERR-AEROSPACE TOULOUSE SAS, Toulouse (FR)

(72) Inventors: Mickael Bregoli, Toulouse (FR); Arnaud Caron, Toulouse (FR); Viviane Ciais, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 305 days.

(21) Appl. No.: 17/639,838

(22) PCT Filed: Sep. 1, 2020

(86) PCT No.: PCT/EP2020/074275
§ 371 (c)(1),
(2) Date: Mar. 2, 2022

(87) PCT Pub. No.: WO2021/043733
PCT Pub. Date: Mar. 11, 2021

(65) Prior Publication Data
US 2022/0235973 A1 Jul. 28, 2022

(30) Foreign Application Priority Data
Sep. 2, 2019 (FR) .................................. FR1909633

(51) Int. Cl.
*F25B 1/053* (2006.01)
(52) U.S. Cl.
CPC .................................. *F25B 1/053* (2013.01)
(58) Field of Classification Search
CPC ..... F25B 1/053; B61D 27/0018; B64D 13/08; B64D 2013/0648; B64D 2013/0662; B64D 13/06; Y02T 50/50
See application file for complete search history.

(56) References Cited

U.S. PATENT DOCUMENTS 3,834,126 A * 9/1974 DiMinno, Jr. ......... B64D 13/00
55/327
8,042,354 B1 * 10/2011 Dziorny ................ B64D 13/06
62/402
(Continued)

FOREIGN PATENT DOCUMENTS

EP 2868579 A1 5/2015

OTHER PUBLICATIONS

Andrae R. "Luftgestuetze Klimatisierung Von Reisezugwagen Air-Based Air Conditioning of Passenger Cars Climatisation a Base D'air Pour Voitures a Voyageurs".
(Continued)

*Primary Examiner* — Miguel A Diaz
*Assistant Examiner* — Ibrahim A. Michael Adeniji
(74) *Attorney, Agent, or Firm* — CRGO Global; Steven M. Greenberg

(57) ABSTRACT

Air conditioning system for a cabin of an air or rail transport vehicle, comprising: a pneumatic turbine engine that comprises at least one compressor and at least one turbine (126) and is connected by a mechanical shaft extending along an axis, referred to as the turbine engine axis (132), said turbine comprising an air inlet and an air outlet; and a water extraction loop that comprises a heater (110), a condenser (112) and a water separator (114), is fluidically arranged between an air outlet of the compressor and the air inlet of said turbine (126), and is configured to dry the air supplied to said turbine (126), characterized in that said heater (110), said condenser (112), and said water separator (114) are arranged in series on the turbine engine axis (132) or around said axis, forming the air inlet of said turbine (126).

11 Claims, 4 Drawing Sheets

(56) References Cited

U.S. PATENT DOCUMENTS

| | | | | |
|---|---|---|---|---|
| 11,780,589 | B2* | 10/2023 | Bruno | B64D 13/06 62/402 |
| 2002/0088245 | A1* | 7/2002 | Sauterleute | B64D 13/06 62/304 |
| 2002/0121103 | A1* | 9/2002 | Udobot | F28F 19/006 62/93 |
| 2004/0074253 | A1* | 4/2004 | Leathers | B64F 1/362 62/401 |
| 2005/0115249 | A1* | 6/2005 | Haas | B64D 13/06 62/93 |
| 2015/0121909 | A1* | 5/2015 | Koenig | B64D 13/06 62/61 |

OTHER PUBLICATIONS

E Vrail—Glasers Annalen: Zeitschrift Fuer Das Gesamte System Bahn, Georg Siemens Verlag GMBH & CO. KG, DE, vol. 124, No. 11, Nov. 1, 2000 (Nov. 1, 2000), pp. 587-592.
p. 588, col. 1-col. 2; figure 1.

* cited by examiner

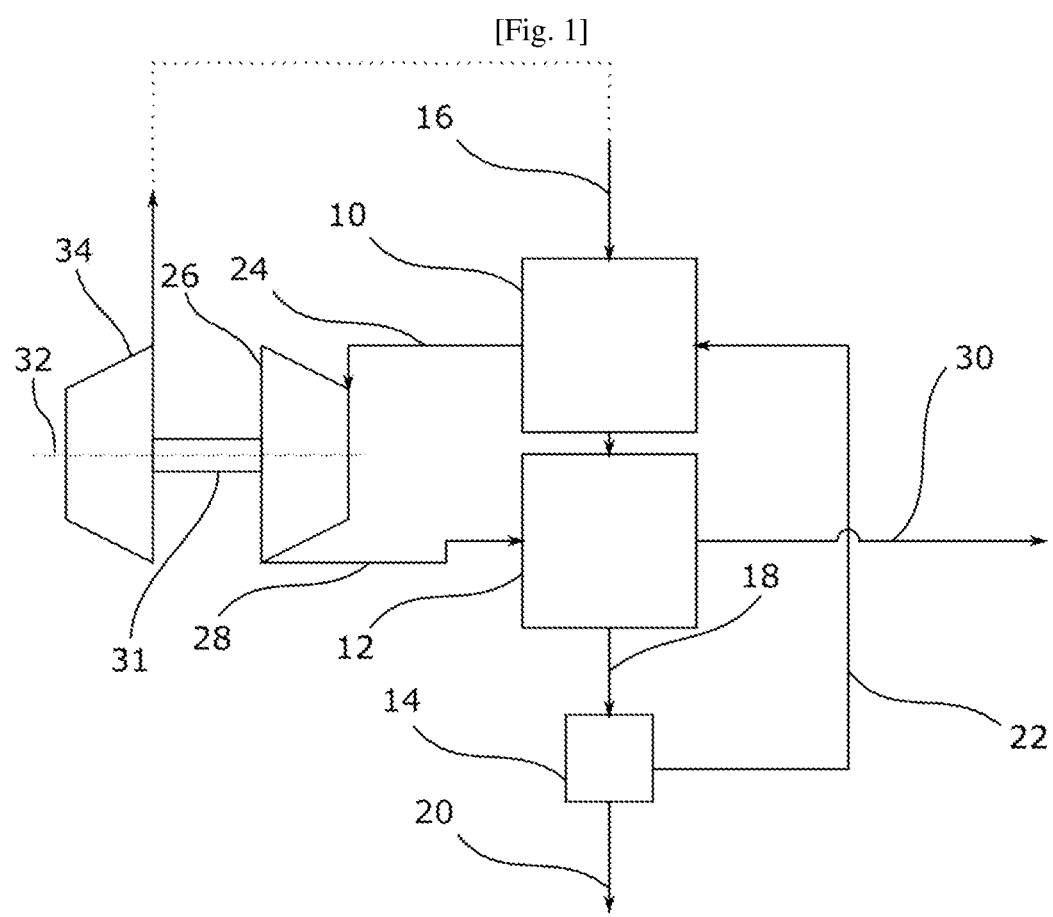
[Fig. 1]

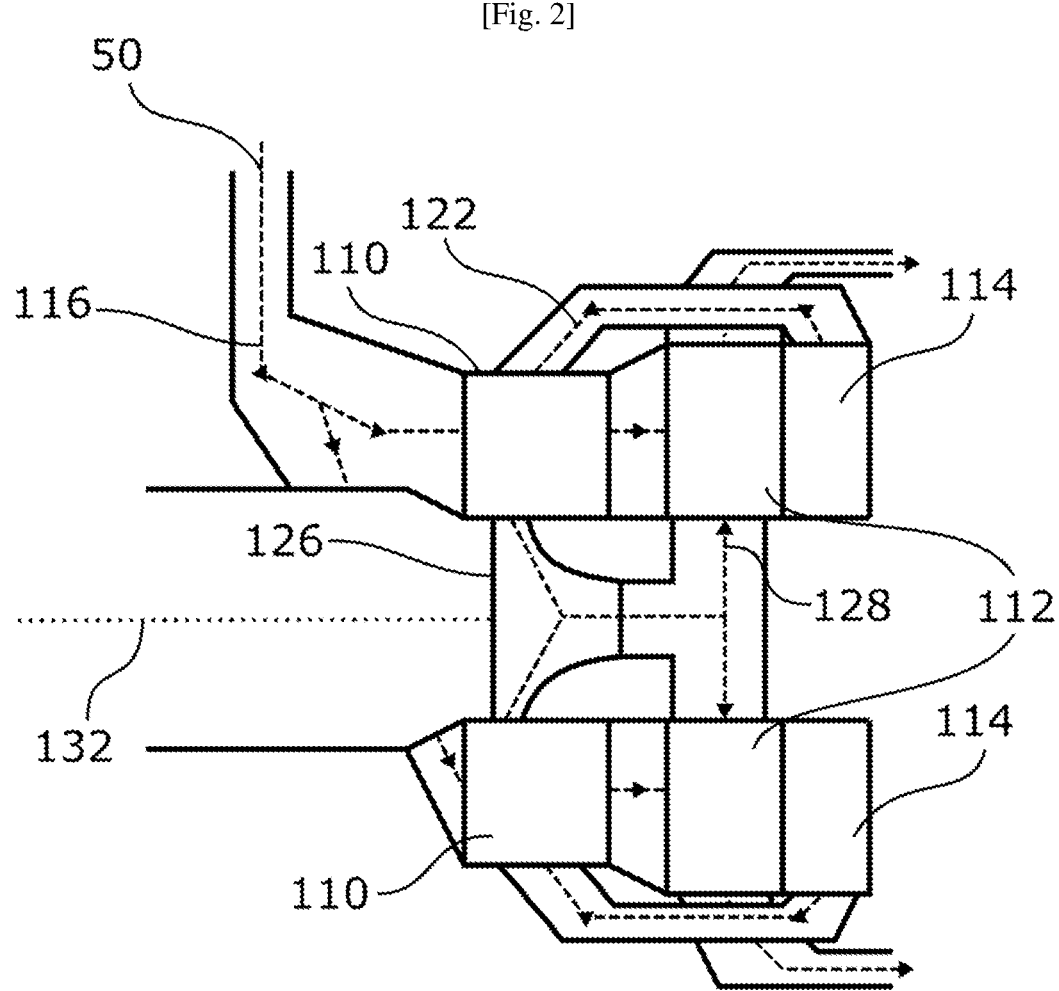
[Fig. 2]

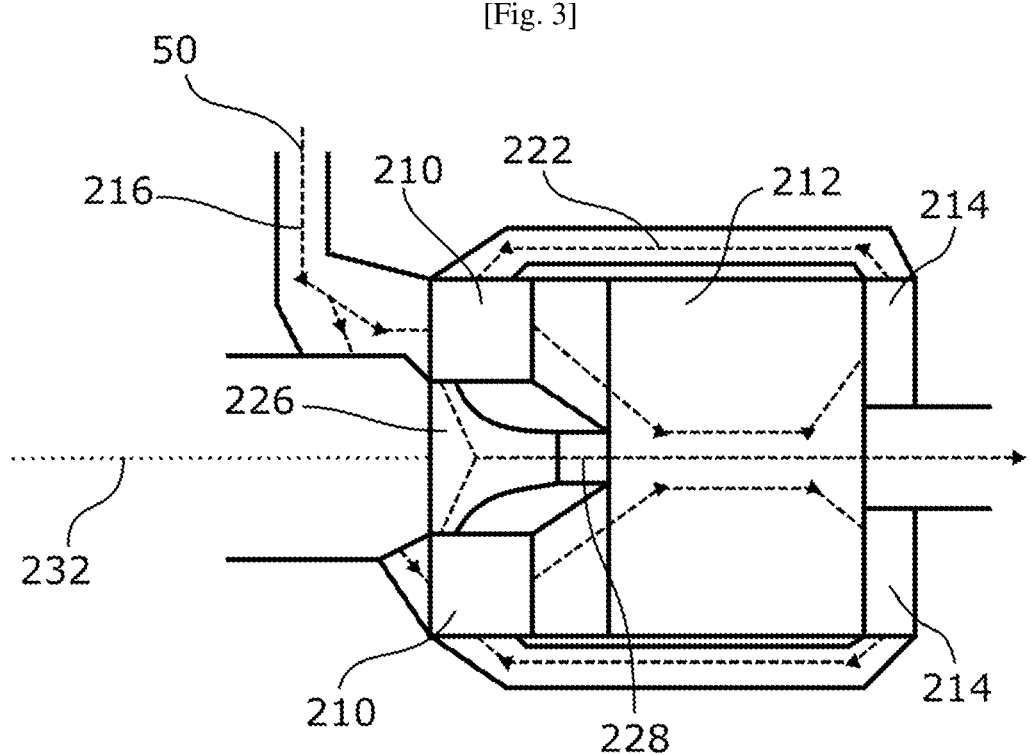
[Fig. 3]
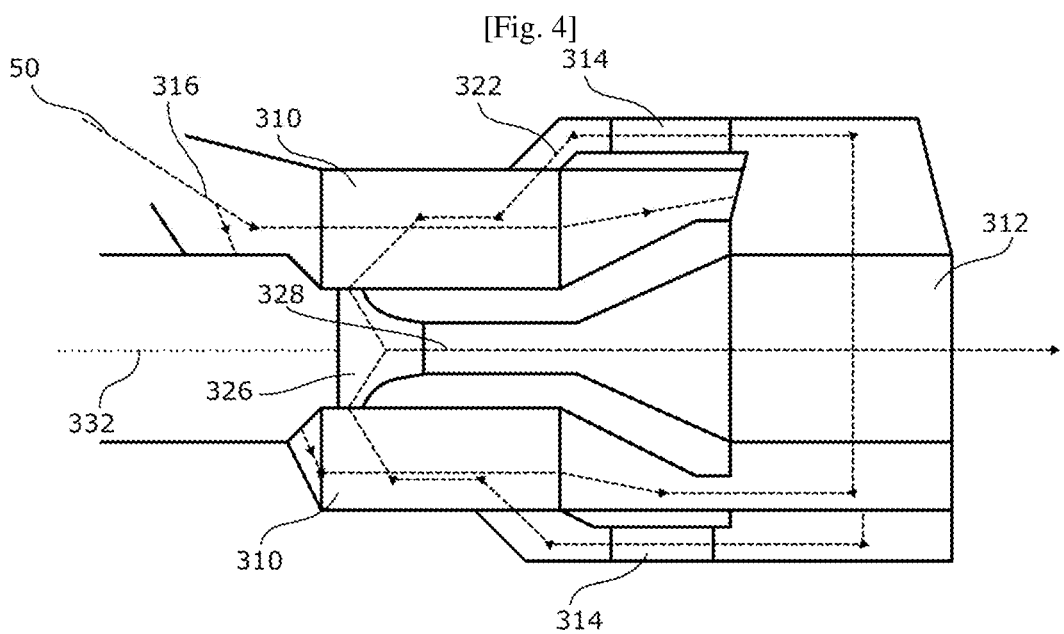
[Fig. 4]

[Fig. 5]
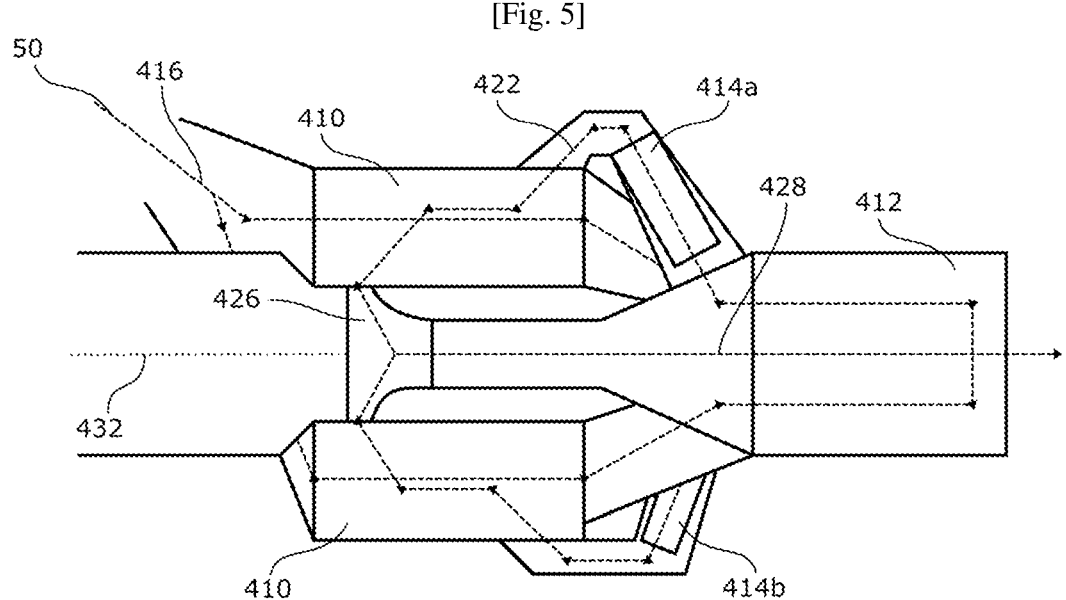

AIR CONDITIONING SYSTEM WITH INTEGRATED WATER EXTRACTION LOOP

CROSS-REFERENCE TO RELATED APPLICATIONS

This application is a § 371 national phase entry of International Application No. PCT/EP2020/074275, filed Sep. 1, 2020, which claims priority to French Patent Application No. 1909633 filed on Sep. 2, 2019.

TECHNICAL FIELD OF THE INVENTION

The invention relates to an air conditioning system for an aircraft. In particular, the invention relates to an air conditioning system comprising an optimized water extraction loop.

Technological Background

In an aircraft, an air conditioning system makes it possible to treat the air that is intended in particular for supplying the cabin of the aircraft. Throughout the text, the term "cabin" denotes any interior space of an aircraft in which the pressure and/or temperature of the air needs to be controlled. This may be a cabin for passengers, the pilot's cockpit, a hold, and in general any area of the aircraft that requires air at a controlled pressure and/or temperature.

Air treatment consists in particular in adjusting the temperature, pressure, humidity, etc., of air from an air source of the aircraft, for example by bleeding air from the propulsion engines of the aircraft, this air usually being referred to as bleed air. This air source can also be external ram air which is treated by various devices to bring it to a temperature and pressure compatible with the requirements of the cabin.

Conventional air conditioning systems comprise a pneumatic turbine engine that comprises at least one compressor and at least one turbine and is interconnected by a mechanical shaft such that the compressor and the turbine are driven together.

The turbine of the turbine engine is generally associated with an assembly referred to using the term "water extraction loop," which comprises at least two heat exchangers—a first heat exchanger referred to using the term "heater" and a second heat exchanger referred to using the term "condenser"—and a water extractor, which is also referred to using the term "water separator."

The extraction loop is intended for drying the air before it is injected into the turbine of the air cycle turbine engine in order to be expanded and distributed to a mixing chamber connected to the cabin of the aircraft.

The thermodynamic performance of an air conditioning system (also referred to using the term air conditioning pack) is linked to the water extraction performance of the water extraction loop. In addition, a high-performance water extraction loop makes it possible to increase the reliability of the conditioning pack by preventing erosion of the turbine.

FIG. 1 schematically shows a water extraction loop and a turbine of an air cycle turbine engine according to an embodiment commonly used on aircraft.

The water extraction loop comprises a heater 10, a condenser 12, and a water separator 14. Air 16 supplied by the air conditioning system successively passes through the heater 10 and condenser 12 as a hot pass. The air 18 leaving the condenser passes through the water separator 14, which recovers the water 20 that can be used in the air conditioning system (for example that can be injected into a cooling ram air channel).

The dried air 22 leaving the water separator 14 passes through the heater 10 as a cold pass.

The air 24 leaving the heater is led to the inlet of the turbine 26 of the air conditioning system. At the outlet of the turbine 26, the air 28 passes through the condenser 12 as a cold pass and the air 30 leaving the condenser is conveyed to the cabin of the aircraft (after possibly passing through a mixing chamber).

The turbine 26 generally forms part of an air cycle turbine engine comprising a turbine engine shaft 31 on which the turbine 26 and a compressor 34 are secured. The turbine 26 allows energy recovery to drive the compressor 34, which compresses air from the air conditioning system upstream of turbine 26. The shaft 31, the turbine 26 and the compressor 34 are configured to rotate about an axis 32 of the turbine engine. The air 16 comes from the compressor 34 and may have been subjected to various treatments, for example passing through a main-exchanger-type exchanger in order to be cooled by ram air.

A water extraction loop is therefore an essential but bulky element of current air conditioning systems. In particular, it is necessary to have a particular number of pipes in order to fluidically connect the heater, the condenser, the water separator, and the turbine of the air cycle turbine engine.

Insofar as the space available on board aircraft that is reserved for air conditioning systems is increasingly reduced, inventors have sought to provide a new water extraction loop design that makes it possible to reduce its impact in terms of overall size while maximizing its performance.

Aims of the Invention

The invention aims to provide a more compact air conditioning system.

The invention aims in particular to provide an air conditioning system having a water extraction loop that has a limited overall size compared with known solutions.

The invention also aims to provide, in at least one embodiment, an air conditioning system comprising a more compact, more integrated, and more efficient water extraction loop than in the known systems.

The invention also aims to provide, in at least one embodiment, an air conditioning system comprising a water extraction loop that can be manufactured by additive manufacturing.

The invention also aims to provide an air conditioning system compatible with aeronautical, rail, and automobile applications.

Finally, the invention aims to provide a transport vehicle such as an aircraft that is equipped with an air conditioning system according to the invention.

Disclosure of the Invention

To this end, the invention relates to an air conditioning system for a cabin of an air or rail transport vehicle, comprising:
- a pneumatic turbine engine that comprises at least one compressor and at least one turbine and is connected by a mechanical shaft extending along an axis, referred to as the turbine engine axis, said turbine comprising an air inlet and an air outlet; and a water extraction loop that comprises a heater, a condenser and a water separator, is fluidically arranged between an air outlet of the compressor and the air inlet of said turbine, and is configured to be able to dry the air supplied to said turbine.

An air conditioning system according to the invention is characterized in that:

said heater, said condenser and said water separator are arranged in series, forming the air inlet of said turbine;

said heater is arranged on the turbine engine axis or around said axis;

said condenser is arranged on the turbine engine axis or around said axis; and said water separator is arranged on the turbine engine axis or around said axis.

An air conditioning system according to the invention therefore makes it possible to significantly reduce the overall size of the water extraction loop by arranging the heater, the condenser and the water separator on or around the turbine engine axis.

The arrangement in series of the elements of the heater, the condenser and the water separator is understood from a fluidic point of view, the fluid leaving the compressor passing, in sequence, first through the heater, then the condenser, and finally the water separator.

In addition, the performance of the water extraction loop is improved by the proximity of the elements to each other, and the proximity to the turbine, in particular due to the reduction in pressure drops.

The invention makes it possible to integrate the functions of the heater, the condenser and the water separator on the turbine engine axis or in an annular manner around said axis.

Preferably, the various components of the water extraction loop are each annular or cylindrical in order to be able to be integrated around the axis of the turbine engine and/or have rotational symmetry along the axis of the turbine engine.

Advantageously and according to the invention, the heater is selected from the following alternatives:

a cross-flow heat exchanger, in which a first flow formed by a cold air pass and a second flow formed by a hot air pass cross;

a co-current flow heat exchanger, in which a first flow formed by a cold air pass and a second flow formed by a hot air pass are parallel and in the same direction; and a counter-current flow heat exchanger, in which a first flow formed by a cold air pass and a second flow formed by a hot air pass are parallel and in opposite directions.

According to this aspect of the invention, the heater can take different forms depending on the desired performance, the tolerated pressure drops, the configuration of the air conditioning system, the devices adjoining the air conditioning system when said system is integrated into a vehicle, etc.

Advantageously and according to the invention, the condenser is selected from the following alternatives:

a cross-flow heat exchanger, in which a first flow formed by a cold air pass and a second flow formed by a hot air pass cross;

a co-current flow heat exchanger, in which a first flow formed by a cold air pass and a second flow formed by a hot air pass are parallel and in the same direction; and a counter-current flow heat exchanger, in which a first flow formed by a cold air pass and a second flow formed by a hot air pass are parallel and in opposite directions.

According to this aspect of the invention, the condenser can take different forms depending on the desired performance, the tolerated pressure drops, the configuration of the air conditioning system, the devices adjoining the air conditioning system when said system is integrated into a vehicle, etc.

Advantageously and according to the invention, the condenser is arranged such that an inlet of a cold air pass of the condenser is in the axis of the turbine engine, opposite the air outlet of the turbine.

According to this aspect of the invention, the condenser directly receives the air leaving the turbine to form the cold air pass. The cold air pass makes it possible to cool the hot air pass of the condenser, after passing through the heater and before passing through the water separator.

Advantageously and according to the invention, the water separator is formed of at least two water sub-separators, each water sub-separator being directly integrated into the condenser at an outlet of a hot air pass of said condenser.

According to this aspect of the invention, the water separator is directly integrated into the outlet of the condenser, allowing an improvement in compactness and a reduction in pressure drops.

The invention also relates to an air or rail transport vehicle, comprising a cabin configured to be supplied with conditioned air, characterized in that said vehicle comprises an air conditioning system according to the invention which is configured to supply conditioned air to the cabin.

The invention also relates to an air conditioning system and a transport vehicle that are characterized in combination by all or some of the features mentioned above or below.

LIST OF FIGURES

Further aims, features and advantages of the invention can be found in the following description, which is provided solely as a non-limiting example, and which refers to the accompanying figures, in which:

FIG. 1 is a schematic view of a water extraction loop according to the prior art, which loop has already been described;

FIG. 2 is a sectional schematic view of an air conditioning system according to a first embodiment of the invention;

FIG. 3 is a sectional schematic view of an air conditioning system according to a second embodiment of the invention;

FIG. 4 is a sectional schematic view of an air conditioning system according to a third embodiment of the invention; and FIG. 5 is a sectional schematic view of an air conditioning system according to a fourth embodiment of the invention.

DETAILED DESCRIPTION OF AN EMBODIMENT OF THE INVENTION

For the sake of illustration and clarity, the drawings do not strictly adhere to scales and proportions.

Moreover, identical, similar, or analogous elements are denoted by the same reference signs throughout the figures.

FIG. 1 (already described) illustrates the general operating principle of a water extraction loop. The various embodiments described below follow this operating principle with regard to the elements making up the water extraction loop, the air flow of the air conditioning circuit, and the various stages of the passage of this air flow through the various elements of the water extraction loop.

FIGS. 2 to 5 show four embodiments of the invention in which the heater, the condenser and the water separator of the water extraction loop are arranged in series on the axis, or around said axis, of a turbine engine that comprises a compressor and a turbine, forming the air inlet of said turbine.

The figures show the turbine and the water extraction loop in section along a plane including the axis of the turbine engine.

The invention therefore makes it possible, in all these embodiments, to provide a compact and well-integrated water extraction loop around the turbine.

The air extraction loop is supplied, in all the embodiments, by a source 50 of air which circulates in the air conditioning system and in particular comes from an outlet of a main heat exchanger of a conventional air conditioning system.

FIG. 2 shows a first embodiment of the invention, in which:
- the heater 110 is what is referred to as a cross-flow heat exchanger, that is to say that the air flow 116 forming the hot pass of the heater and the air flow 122 forming the cold pass of the heater cross, for example are substantially perpendicular or at another angle, preferably between 45° and 90°;
- the heater 110 is cylindrical and surrounds the axis 132 of the turbine engine and the turbine 126 such that the outlet of the cold pass of the heater leads directly into the air inlet of the turbine 126;
- the condenser 112 is what is referred to as a cross-flow heat exchanger, that is to say that the air flow 116 forming the hot pass of the condenser and the air flow 128 forming the cold pass of the condenser cross, for example are substantially perpendicular or at another angle, preferably between 45° and 90°;
- the condenser 112 is cylindrical, surrounds the turbine engine axis 132, and leads directly into the separator 114; and
- the water separator 114, supplied directly by the condenser 112 (that is to say without piping between the condenser and the water separator), also surrounds the axis 132 of the turbine engine.

FIG. 3 shows a second embodiment of the invention, in which:
- the heater 210 is what is referred to as a cross-flow heat exchanger, that is to say that the air flow 216 forming the hot pass of the heater and the air flow 228 forming the cold pass of the heater cross, for example are substantially perpendicular or at another angle, preferably between 45° and 90°;
- the heater 210 is cylindrical and surrounds the axis 232 of the turbine engine and the turbine 226 such that the outlet of the cold pass of the heater leads directly into the air inlet of the turbine;
- the condenser 212 is what is referred to as a co-current flow heat exchanger, that is to say that the air flow 216 forming the hot pass of the condenser and the air flow 222 forming the cold pass of the condenser are substantially parallel and flow in the same direction;
- the condenser 212 is cylindrical and surrounds the axis 232 of the turbine engine; the outlet of the turbine leads directly into the inlet of the cold pass of the condenser 212, which inlet is arranged in the axis of the turbine engine, and the outlet of the condenser 212 leads directly into the water separator 214; and
- the water separator 214, supplied directly by the condenser 212 (that is to say without piping between the condenser and the water separator), surrounds the axis 232 of the turbine engine.

FIG. 4 shows a third embodiment of the invention, in which:
- the heater 310 is what is referred to as a counter-current flow heat exchanger, that is to say that the air flow 316 forming the hot pass of the heater and the air flow 328 forming the cold pass of the heater are substantially parallel and flow in opposite directions;
- the heater 310 is cylindrical and surrounds the axis 332 of the turbine engine and the turbine 326 such that the outlet of the cold pass of the heater leads directly into the air inlet of the turbine;
- the condenser 312 is what is referred to as a cross-flow heat exchanger, that is to say that the air flow 316 forming the hot pass of the condenser and the air flow 328 forming the cold pass of the condenser cross, for example are substantially perpendicular or at another angle, preferably between 45° and 90';
- the condenser 312 surrounds the turbine engine axis; the inlet to the cold pass of the condenser 212 is supplied directly by the outlet of the turbine (that is to say without piping between the outlet of the turbine and the inlet of the cold pass of the condenser) and is arranged in the axis 332 of the turbine engine;
- the condenser 312 is a dual condenser, that is to say that each hot pass passes through the entire condenser 312 in a direction perpendicular to the axis of the turbine engine; and
- the water separator 314 surrounds the axis 332 of the turbine engine.

FIG. 5 shows a fourth embodiment of the invention, in which:
- the heater 410 is what is referred to as a counter-current flow heat exchanger, that is to say that the air flow 416 forming the hot pass of the heater and the air flow 428 forming the cold pass of the heater are substantially parallel and flow in opposite directions;
- the heater 410 is cylindrical and surrounds the axis 432 of the turbine engine and the turbine 426 such that the outlet of the cold pass of the heater leads directly into the air inlet of the turbine;
- the condenser 412 is what is referred to as a U-flow heat exchanger, that is to say that the air flow 416 forming the hot pass of the condenser and the air flow 428 forming the cold pass of the condenser are substantially parallel, and the air flow 416 forming the hot pass flows successively in the same direction as and then in a direction opposite to the air flow 428 forming the cold pass of the condenser;
- the condenser 412 surrounds the axis 432 of the turbine engine; the inlet of the cold pass of the condenser 412 is supplied directly by the outlet of the turbine (that is to say without piping between the outlet of the turbine and the inlet of the condenser) and is arranged in the axis of the turbine engine; and
- the water separator consists of a plurality of water sub-separators 414a, 414b, each being integrated into a hot pass outlet of the condenser 412, the sub-separators 414a, 414b being arranged all around the axis 432 of the turbine engine.

The invention is not limited to the embodiments shown; different types of heater, condenser and water separator can be used in different configurations that are not shown but are compatible with the desired operation. In general, the invention can be implemented by any design which makes it possible to integrate the functions of the heater, the condenser and the water separator on the turbine engine axis or in an annular manner around said axis, so as to limit the overall size of the air conditioning pack and improve performance of the water extraction loop by limiting pressure drops.

The invention claimed is:
1. An air conditioning system for a cabin of an air or rail transport vehicle, comprising:
   a pneumatic turbine engine that comprises at least one compressor and at least one turbine and is connected by a mechanical shaft extending along an axis, referred to as the turbine engine axis, said turbine comprising an air inlet and an air outlet, and
   a water extraction loop that comprises a heater, a condenser, and a water separator, is arranged fluidically between an air outlet of the compressor and the air inlet of said turbine, and is configured to be able to dry the air supplied to said turbine, wherein:
   said heater, said condenser, and said water separator are arranged in series, forming the air inlet of said turbine;
   said heater is arranged on the turbine engine axis or around said axis;
   said condenser is arranged on the turbine engine axis or around said axis;
   said water separator is arranged on the turbine engine axis or around said axis;
   said heater is cylindrical and surrounds the axis of the turbine engine and the turbine such that an outlet of a cold pass of the heater leads directly into the air inlet of the turbine, the outlet of the cold pass of the heater abutting the air inlet of the turbine without piping between the outlet of the cold pass of the heater and the inlet of the turbine.

2. The air conditioning system according to claim 1, wherein the heater is a cross-flow heat exchanger, in which a first flow formed by a cold air pass and a second flow formed by a hot air pass cross.

3. The air conditioning system according to claim 1, wherein the heater is a co-current flow heat exchanger, in which a first flow formed by a cold air pass and a second flow formed by a hot air pass are parallel and in the same direction.

4. The air conditioning system according to claim 1, wherein the heater is a counter-current flow heat exchanger, in which a first flow formed by a cold air pass and a second flow formed by a hot air pass are parallel and in opposite directions.

5. The air conditioning system according to claim 1, wherein the condenser is a cross-flow heat exchanger, in which a first flow formed by a cold air pass and a second flow formed by a hot air pass cross.

6. The air conditioning system according to claim 1, wherein the condenser is a co-current flow heat exchanger, in which a first flow formed by a cold air pass and a second flow formed by a hot air pass are parallel and in the same direction.

7. The air conditioning system according to claim 1, wherein the condenser is a counter-current flow heat exchanger, in which a first flow formed by a cold air pass and a second flow formed by a hot air pass are parallel and in opposite directions.

8. The air conditioning system according to claim 1, wherein the condenser is arranged such that an inlet of a cold air pass of the condenser is in the axis of the turbine engine, opposite the air outlet of the turbine.

9. The air conditioning system according to claim 1, wherein the water separator is formed of at least two water sub-separators, each water sub-separator being directly integrated into the condenser at an outlet of a hot air pass of said condenser.

10. The air conditioning system according to claim 1, wherein said condenser and said water separator are each annular or cylindrical in order to be able to be integrated around the axis of the turbine engine and/or have rotational symmetry along the axis of the turbine engine.

11. An air or rail transport vehicle, comprising a cabin configured to be supplied with conditioned air, wherein said vehicle comprises an air conditioning system which is configured to supply said cabin with conditioned air, the system comprising:
   a pneumatic turbine engine that comprises at least one compressor and at least one turbine and is connected by a mechanical shaft extending along an axis, referred to as the turbine engine axis, said turbine comprising an air inlet and an air outlet, and
   a water extraction loop that comprises a heater, a condenser, and a water separator, is arranged fluidically between an air outlet of the compressor and the air inlet of said turbine, and is configured to be able to dry the air supplied to said turbine, wherein:
   said heater, said condenser, and said water separator are arranged in series, forming the air inlet of said turbine;
   said heater is arranged on the turbine engine axis or around said axis;
   said condenser is arranged on the turbine engine axis or around said axis;
   said water separator is arranged on the turbine engine axis or around said axis;
   said heater is cylindrical and surrounds the axis of the turbine engine and the turbine, an outlet of a cold pass of the heater abutting the air inlet of the turbine without piping between the outlet of the cold pass of the heater and the inlet of the turbine such that the outlet of the cold pass of the heater leads directly into the air inlet of the turbine.

* * * * *